(12) United States Patent
Kwon et al.

(10) Patent No.: US 10,340,559 B2
(45) Date of Patent: Jul. 2, 2019

(54) SECONDARY BATTERY PACK

(71) Applicant: SK INNOVATION CO., LTD., Seoul (KR)

(72) Inventors: Dae Won Kwon, Daejeon (KR); Ho Chul Kang, Daejeon (KR); O Sung Kwon, Daejeon (KR); Seok Chun Cho, Daejeon (KR); Sei Hoon Cho, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 27 days.

(21) Appl. No.: 15/625,827

(22) Filed: Jun. 16, 2017

(65) Prior Publication Data

US 2017/0365888 A1 Dec. 21, 2017

(30) Foreign Application Priority Data

Jun. 17, 2016 (KR) .................. 10-2016-0075922

(51) Int. Cl.
*H01M 10/60* (2014.01)
*H01M 10/48* (2006.01)
(Continued)

(52) U.S. Cl.
CPC ......... *H01M 10/48* (2013.01); *H01M 2/1077* (2013.01); *H01M 2/202* (2013.01); *H01M 2/206* (2013.01); *H01M 2/305* (2013.01); *H01M 10/4207* (2013.01); *H01M 10/4257* (2013.01); *H01M 10/613* (2015.04);
(Continued)

(58) Field of Classification Search
CPC .. H01M 10/48; H01M 2/305; H01M 10/6556; H01M 10/625; H01M 2/202; H01M 10/4207; H01M 10/4257; H01M 10/6557; H01M 2/206; H01M 2/1077; H01M 10/613; H01M 10/6551; H01M 2010/4271; H01M 2200/00; H01M 2200/103

See application file for complete search history.

(56) References Cited

U.S. PATENT DOCUMENTS

2006/0088761 A1* 4/2006 Ota .................. H01M 2/18
429/130
2010/0052692 A1 3/2010 Yano et al.
(Continued)

FOREIGN PATENT DOCUMENTS

DE 10 2014 112 802 4/2015
EP 2 362 463 8/2011
(Continued)

OTHER PUBLICATIONS

The extended European Search Report issued by the European Patent Office dated Nov. 29, 2017.

*Primary Examiner* — Cynthia K Walls
(74) *Attorney, Agent, or Firm* — IP & T Group LLP (57) ABSTRACT

A secondary battery pack includes: a secondary battery module including battery cells and cooling fins; a first structure formed under the secondary battery module and including a cooling channel and coupling brackets; a second structure which is formed in a shape mounted on side faces of the secondary battery module and includes a printed circuit board; and a cover mounted over the second structure.

19 Claims, 8 Drawing Sheets

(51) Int. Cl.
  *H01M 10/6557*   (2014.01)
  *H01M 2/20*      (2006.01)
  *H01M 10/42*     (2006.01)
  *H01M 2/10*      (2006.01)
  *H01M 2/30*      (2006.01)
  *H01M 10/625*    (2014.01)
  *H01M 10/6556*   (2014.01)
  *H01M 10/6551*   (2014.01)
  *H01M 10/613*    (2014.01)

(52) U.S. Cl.
  CPC ..... *H01M 10/625* (2015.04); *H01M 10/6551* (2015.04); *H01M 10/6556* (2015.04); *H01M 10/6557* (2015.04); *H01M 2010/4271* (2013.01); *H01M 2200/00* (2013.01); *H01M 2200/103* (2013.01)

(56) References Cited

U.S. PATENT DOCUMENTS

2010/0151312 A1   6/2010  Kim et al.
2011/0206948 A1*  8/2011  Asai ................. H01M 2/0473
                                                        429/7
2016/0036019 A1   2/2016  Gunna et al.
2016/0126531 A1   5/2016  Kim et al.

FOREIGN PATENT DOCUMENTS

EP        2 955 780      12/2015
EP        3 002 804       4/2016
JP        2015-76187      4/2015
KR        101355961       2/2014
WO      WO 2015/083569    6/2015

* cited by examiner

SECONDARY BATTERY PACK

CROSS REFERENCE TO RELATED APPLICATIONS AND CLAIM OF PRIORITY

The application claims the benefit of Korean Patent Application No. 10-2016-0075922, filed on Jun. 17, 2016, at the Korean Intellectual Property Office, the disclosures of which are incorporated herein in their entirety by reference.

BACKGROUND OF THE INVENTION

1. Field of the Invention

The present invention relates to a secondary battery pack in embodiments thereof.

2. Description of the Related Art

Research into a rechargeable secondary battery capable of being charged and discharged has been actively conducted for various devices such as a digital camera, a cellular phone, a laptop computer, a hybrid automobile, and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile. A plurality of lithium secondary batteries are connected in series with each other to be used for a high output hybrid automobile. Since this lithium secondary battery has operating voltage three times higher than that of the nickel-cadmium battery or the nickel-metal hydride battery and has excellent energy density characteristics per unit weight which exceed that of the nickel-cadmium battery or the nickel-metal hydride battery, the lithium secondary battery has rapidly increased.

Figure 1:
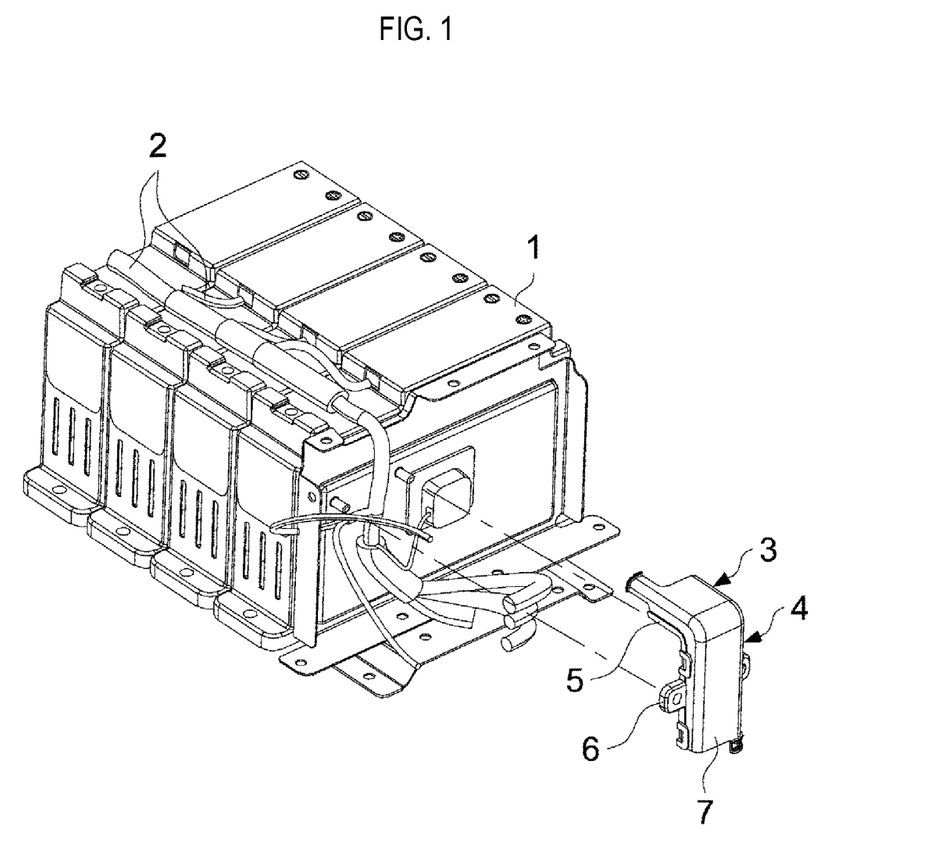
FIG. 1 is a perspective view showing a conventional battery module.

Referring to FIG. 1, a conventional battery pack 1 includes a printed circuit board, a connector, a wiring harness, and the like, as well as covers and protective structures for protecting these components. As shown in FIG. 1, a wiring harness 2 includes many protective structures such as a stand portion 3 into which the wiring harness 2 is inserted and aligned, an aligning portion 4 for protecting the wiring harness 2, a stand plate 5 on which the stand portion 3 is mounted and aligned, coupling ribs 6, an aligning cover 7, and the like. As such, the conventional battery pack 1 includes many components for protecting the wiring harness 2. Therefore, the number of assembling processes and a size of conventional battery pack 1 are increased.

The conventional battery pack 1 includes components for protecting a battery management system (BMS), a connector, and the like, as well as protector components for protecting the wiring harness. Herein, protective components such as upper and lower covers of the battery pack make up a considerable portion of the battery pack. As such, costs, a weight, and a volume density of the conventional battery module tend to increase due to the overlapping portions of a cartridge, a partition, the upper and lower covers, or the like.

As a technique relating to the battery pack known in the related art, an apparatus for containing battery pack including a stack in which a plurality of battery housing units are provided is disclosed in Korean Patent Registration No. 10-1355961 (registered on Jan. 21, 2014).

SUMMARY OF THE INVENTION

An object of the present invention is to provide a secondary battery pack capable of reducing the number of duplicative protective structures disposed therein and integrating a plurality of functions into one.

In addition, another object of the present invention is to provide a secondary battery pack capable of reducing the number of parts by integrating a lower cover structure, a cooling structure, and a vehicle mounting bracket of a secondary battery module into one unit.

Further, another object of the present invention is to provide a secondary battery pack capable of reducing a volume and a weight density with the reduced number of parts.

Further, another object of the present invention is to provide a secondary battery pack capable of assembling with the reduced number of processes.

According to an aspect of the present invention, there is provided a secondary battery pack, including; a secondary battery module including battery cells and cooling fins; a first structure formed under the secondary battery module and including a cooling channel and coupling brackets; a second structure which is formed in a shape mounted on side faces of the secondary battery module and includes a printed circuit board; and a cover mounted over the second structure.

Herein, the first structure may include: a plate; and side structure provided on both sides of the plate, and the plate includes the cooling channel, and the side structures include the bracket.

In addition, the side structure may include an inflow channel and an outflow channel. A coolant is introduced into the inflow channel and discharged through the outflow channel. The inflow channel and the outflow channel may be respectively provided on opposite sides to each other.

Further, the plate may have a plurality of stepped parts which are disposed apart from each other on one surface thereof, and the secondary battery module may be mounted between the stepped portions disposed apart from each other.

Further, the plate may have a placing portion provided over a third side of the plate and including a switch member, and the switch member may include a relay, a fuse, or both.

Further, the secondary battery module may have a structure in which the cooling fins are arranged side by side at a first interval, and each of the battery cells is disposed between the cooling fins.

Further, the secondary battery module, the first structure, and the second structure may be stacked in a first direction, the cooling fins are arranged side by side in a second direction, the second direction is perpendicular to the first direction, each of the cooling fins includes an upper extension and a lower extension, the upper extension extends from a top of each of the cooling fins to a neighboring upper extension in the second direction, the lower extension extends from a bottom of each of the cooling fins to a neighboring lower extension in the second direction, the upper extension is coupled to the neighboring upper extension to form an upper exterior of the secondary battery module, and the lower extension is coupled to the neighboring lower extension to form a lower exterior of the secondary battery module.

Further, the secondary battery module may include a terminal bus bar configured to electrically connect the plurality of electrode tabs with each other, and the terminal bus bar may contact the printed circuit board.

Further, the secondary battery module may include: a terminal unit and first and second electrode tabs, wherein the battery cells include first and second battery cells; wherein the first and the second electrode tabs extend from the first and the second battery cells, respectively; the terminal unit includes a first contact terminal and a first wing terminal; the first contact terminal is disposed between the first and the second electrode tabs and connects the first and the second electrode tabs to each other, and the first wing terminal extends from the first contact terminal.

Further, a jig insertion space may be defined by (i) the first and the second wing terminals, (ii) the second and the third battery cells, and (iii) the second and the third electrode tabs.

Further, a terminal bus bar coupled with the wing terminal may be provided at an outside of the wing terminals disposed to face each other.

Further, the terminal bus bar may contact a contact terminal piece mounted on the printed circuit board.

Further, the second structure may include: a housing; a barrier formed in the housing; a printed circuit board and a wiring harness which are disposed between the housing and the barrier, and holes formed in the housing.

Further, the printed circuit board may include a contact terminal piece configured to measure a voltage, and contacts a terminal bus bar of the secondary battery module to measure a voltage.

Furthermore, the second structure may have an opening formed in one side face thereof at a place corresponding to a position of the placing portion to facilitate a replacement of switch parts including a relay and a fuse.

According to another aspect of the present invention, there is provided a secondary battery pack, including: a secondary battery module including battery cells and cooling fins; a first structure provided under the secondary battery module to protect the secondary battery module and cool the secondary battery module; a second structure which is mounted on the other side of the secondary battery module to protect the secondary battery module, and has a measurement control circuit mounted therein to measure and control a voltage of the secondary battery module; and a cover mounted over the second structure.

Further, the second structure may include a contact terminal piece, wherein the contact terminal piece elastically contacts the measurement control circuit and the secondary battery module and electrically connects the measurement control circuit and the secondary battery module to each other.

According to the embodiments of the present invention, it is possible to provide the secondary battery pack capable of saving costs by reducing the number of protective structures duplicately disposed therein and integrating the plurality of functions into one.

Further, it is possible to reduce the number of parts by integrating the lower cover structure, the cooling structure, and the vehicle mounting bracket of the secondary battery module into one unit.

Further, it is possible to reduce the number of parts and reduce the volume and weight density.

Further, it is possible to reduce the number of assembling processes of the secondary battery pack.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, specific embodiments of the present invention will be described with reference to the accompanying drawings. But, these are only an example, and the present invention is not limited thereto. In the description of the present invention, detailed descriptions of the publicly known functions and configurations that are judged to be able to make the purport of the present invention unnecessarily obscure are omitted. In addition, terms or words used in the specification and claims should not be construed as limited to a lexical meaning, and should be interpreted as definitions known by one of ordinary skill in the art.

However, those skilled in the art will appreciate that such embodiments are provided for illustrative purposes and do not limit subject matters to be protected as disclosed in the detailed description and appended claims. Therefore, it will be apparent to those skilled in the art that various alterations and modifications of the embodiments are possible within the scope and spirit of the present invention and duly included within the appended claims.

The conventional battery pack has a plurality of battery cells connected with each other in series or in parallel to provide a voltage in a required range and battery capacity, and may include a battery management system, hereinafter, referred to as a BMS, a safety switch such as a fuse and a relay, and the like. Further, a battery module is provided with a connector for measuring voltage values of each of the battery cells, and a wiring harness for transferring measurement signals of the voltage values of each of the battery cells to the BMS. Control equipment, a controller, and electronic parts, or the like in the battery pack are housed in designated regions of battery pack. Protective structures configured to protect the parts such as a protector, a partition, a cover, and the like and are duplicately disposed in the battery pack. Therefore, with the number of parts duplicately disposed is increased, a volume and a weight of the battery pack are increased and the number of assembling processes is also increased.

Figure 2:
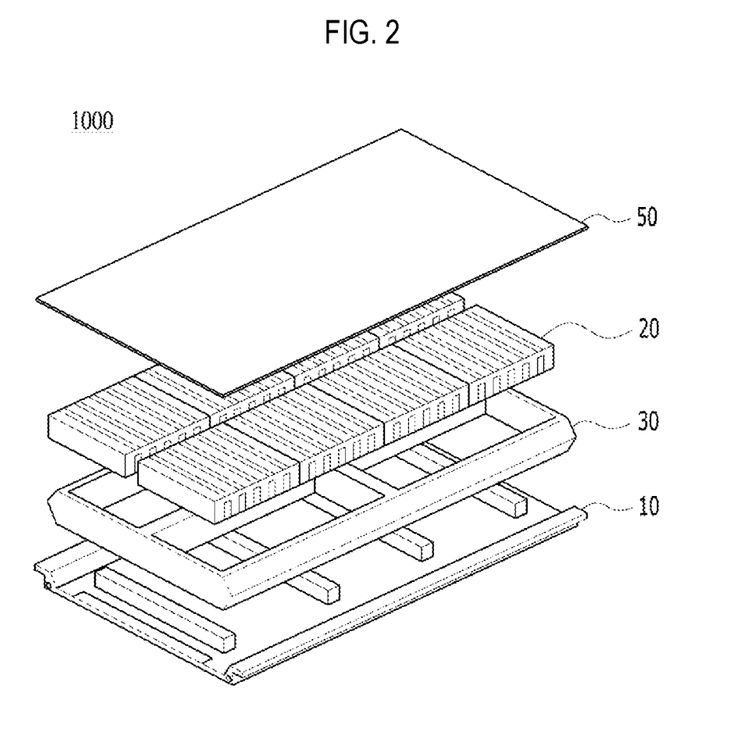
FIG. 2 is an exploded perspective view schematically illustrating a secondary battery pack according to an embodiment of the present invention.

FIG. 2 is an exploded perspective view illustrating a secondary battery pack 1000 according to an embodiment of the present invention. Referring to FIG. 2, the secondary battery pack 1000 according to an embodiment of the present invention may integrate various parts into a single body or unit to simplify the structure of the secondary battery pack. The secondary battery pack 1000 according to an embodiment of the present invention may include a first structure 10, a secondary battery module 20, a second structure 30, and a cover 50.

The first structure 10 may be disposed at one side of the secondary battery module 20 to support and protect the secondary battery module 20 and has a cooling system and a mounting structure. Such the first structure 10 may serve as a cooling support structure. The second structure 30 is an integration structure of a printed circuit board including the BMS and a sensing module, the wiring harness, and the cover. Such the second structure 30 may serve as a multi-functional structure.

Figure 7:
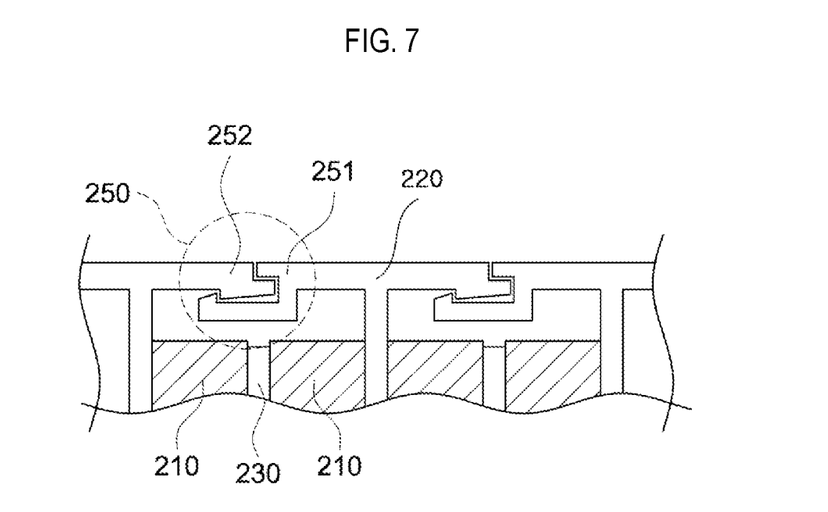
FIG. 7 is an enlarged cross-sectional view illustrating a snap-fit structure according to an embodiment of the present invention.

The secondary battery module 20 is formed by only a battery cell 210 and cooling fins 220 (shown in FIG. 7). The cover 50 may be a cover member that is disposed at a side (the other side) opposite to one side on which the first structure 10 is disposed, the second structure 30, and the secondary battery module 20 are coupled.

The first structure 10 and the second structure 30 are formed under and over the secondary battery module 20, respectively, and then are covered with the cover 50. As a result, one secondary battery pack 1000 may be configured. In the secondary battery pack 1000, the first structure 10 may serve as the cooling support structure, and the second structure 20 may serve as the multi-functional structure. Furthermore, in FIG. 2, the cover 50 is formed in a flat plate shape. Both ends of the cover 50 may be formed with bent portions. Due to the bent portions formed at both ends, the cover 50 may have a shape covering the secondary battery module 20.

The secondary battery pack 1000 according to the present invention may simplify the structure by integrating various parts. The secondary battery pack 1000 according to an embodiment of the present invention may reduce the number of parts and the number of assembling processes by employing the first structure 10, the secondary battery module 20, and the second structure 30. As the functions of parts are integrated, the number of parts may be reduced and the assembling costs may be saved. Furthermore, since the number of duplicated parts is reduced, the volume of the secondary battery pack may be reduced. As the volume and the weight are reduced, high power may be implemented with a given weight.

Figure 3:
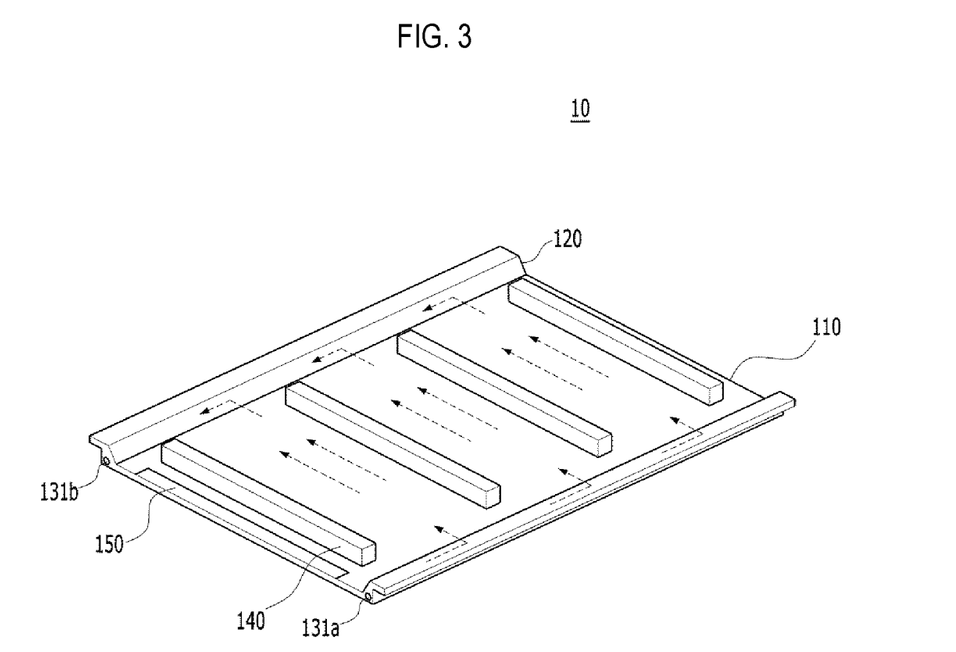
FIG. 3 is a perspective view illustrating a first structure according to an embodiment of the present invention.

FIG. 3 is a perspective view illustrating the first structure 10 according to an embodiment of the present invention. Referring to FIG. 3, the first structure 10 covers one side of the secondary battery module 20. In the first structure 10, a cooling channel and a bracket (or a coupling bracket) are included in an integrated manner. The coupling bracket may be fixedly mounted in a vehicle. The first structure 10 may include a plate 110 and side structures 120.

The plate 110 may be formed by extrusion or press processing. For example, the plate 110 may be formed by extruding an aluminum material. The plate 110 may be formed in a rectangular plate shape. The shape of the plate 110 may be determined in consideration of a size and a shape of the secondary battery module 20. For example, when the secondary battery module 20 is a pouched type, the plate 110 may be in a rectangular plate shape. On the other hand, when the secondary battery module 20 is a cylinder type or a prismatic type, the plate 110 may in a shape fit to or compatible with the secondary battery module shape. The secondary battery module 20 may be positioned on one surface of the plate 110 such that the plate 110 may support the secondary battery module 20. In addition, the first structure 10 is formed in a shape corresponding to the secondary battery module 20, and may cover one side of the secondary battery module 20. Therefore, the first structure 10 may support and protect the secondary battery module 20.

The side structures 120 may be provided on both sides of the plate 110 in a symmetrical shape to each other. The side structures 120 may be coupled to both sides of the plate 110. The side structures 120 and the plate 110 may be coupled to each other by various coupling methods such as bolting, riveting, welding, brazing, or the like. In addition, the side structures 120 may also be integrated with the plate 110. The side structures 120 may serve as the bracket for mounting in the vehicle. That is, the side structures 120 may correspond in shape to a coupling member of a vehicle, and may be manufactured to be changed or replaced depending on various vehicle models.

Furthermore, the side structures 120 may be provided with one or more holes (not shown), and the holes may reduce the weight of the side structure 120. Since the side structures 120 are provided in a length direction of the plate 10, the side structures 120 may provide structural rigidity to the plate 110 in the length direction. The weight of the secondary battery module 20 mounted on an upper surface of the plate 110 may prevent the plate 110 from being bent in the length direction. Furthermore, the side structures 120 may include bolt holes (not shown) which are used to fasten the second structure 30 after the secondary battery module 20 is mounted.

The first structure 10 may include a cooling structure. That is, the side structure 120 may be provided with an inflow channel 131*a*, into which a coolant is introduced, on one side thereof, and an outflow channel 131*b*, from which the coolant is discharged, on the other side thereof. The plate 110 may be provided with a cooling channel 132 in which the coolant flows.

Figure 4:
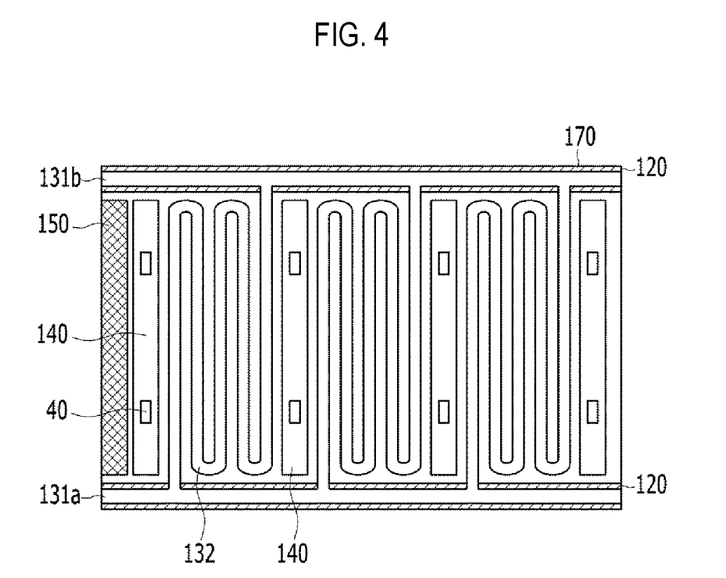
FIG. 4 is a cross-sectional view illustrating a first structure according to an embodiment of the present invention with a cooling structure.

FIG. 4 is a cross-sectional view illustrating the first structure 10 according to an embodiment of the present invention with the cooling structure. Referring to FIG. 4, as described above, the first structure 10 may include the cooling structure. The coolant is introduced through the inflow channel 131*a* on one side of the side structure 120 and may flow in the cooling channel 132 formed in the plate 110. The cooling channel 132 transfers (for example, conduction transfer by contact) a cold air, which is obtained by heat exchange between ambient air and the coolant, to a surface on which the secondary battery module 20 is mounted. Therefore, heat generated from the secondary battery module 20 is cooled by coolant flowing along the cooling channel 132 through the heat exchange.

The coolant passing through the cooling channel 132 of the plate 110 may be discharged from the discharge channel 131*b*. Therefore, the heat of the secondary battery module 20 may be cooled by the coolant flowing through the cooling channel 132. Since the first structure 10 is integrated with the cooling channel 132, even though a separate cooling structure is not provided on an upper side or a lower side of the first structure 10, the secondary battery module 20 may be effectively cooled.

Moreover, instead of forming the cooling channel in the plate 110, the plate 110 may include a heat sink or the like for cooling. The heat sink may be formed on a surface (the other surface) opposite to a surface (one surface) on which the secondary battery module 20 is placed. Furthermore, peripheral areas of the inflow channel 131a and the outflow channel 131b, which are provided in the side structures 120, may be sealed by sealing members 170. By preventing the coolant from being leaked from the channel, a damage of the secondary battery module 20 due to the leakage of the coolant may be prevented.

Figure 5:
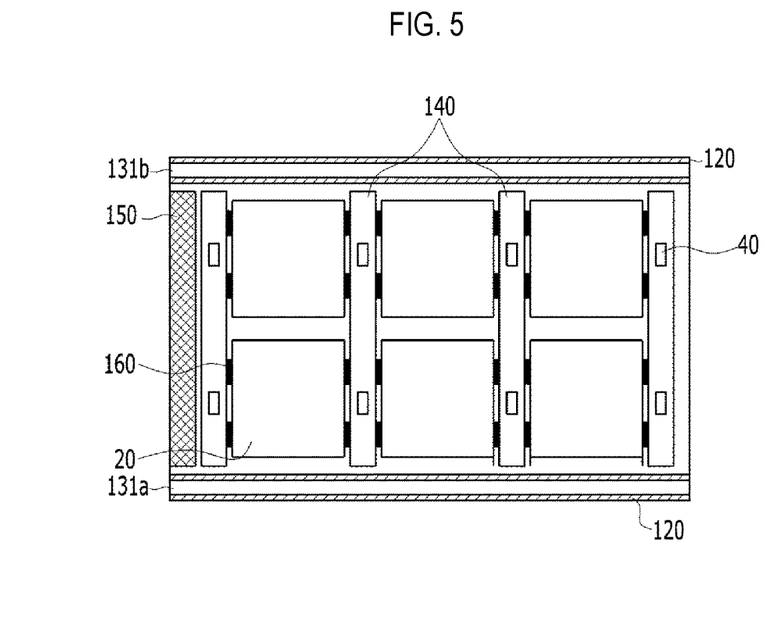
FIG. 5 is a cross-sectional view illustrating a first structure according to an embodiment of the present invention with secondary battery modules.

As illustrated in any one of FIGS. 3 to 5, the plate 110 of the first structure 10 may include stepped portions 140 and a placing portion 150. A plurality of stepped portions 140 may be arranged on the plate 110 at a predetermined interval. The predetermined interval may be set corresponding to a width of the secondary battery module 20. Specifically, since the secondary battery module 20 is disposed between the two stepped portions 140 and is fixed between the two stepped portions 140. The predetermined interval may be set to correspond to the width of the secondary battery module 20, which will be described below. The stepped portion 140 may extend from one side structure 120 of the plate 110 to the other side structure 120.

Switch parts 60 such as a relay, a fuse, and the like may be placed on the placing portion 150. The placing portion 150 may be formed at one end portion of the upper surface of the plate 110. The placing portion 150 may have components such as the switch part 60.

FIG. 5 is a cross-sectional view illustrating the first structure 10 and the secondary battery modules 20 according to an embodiment of the present invention. Referring to FIG. 5, as described above, the plurality of stepped portions 140 may be disposed on the plate 110 of the first structure 10 at the predetermined interval. Since the stepped portions 140 are formed on the upper surface of the plate 110, the plate 110 may have enhanced structural rigidity. Since the stepped portions 140 are provided in a width direction of the plate 110, it is possible to prevent the plate 110 from being bent in the width direction due to the weight of the secondary battery modules 20 mounted on one surface of the plate 110. The stepped portion 140 may be provided with bus bars 40. The bus bars 40 have a predetermined length and are disposed between electrode tabs 211 (referring to FIG. 5) of the battery cell 210 to connect the electrode tabs 211 to each other. The stepped portions 140 may be a mounting point for mounting the secondary battery modules 20. Furthermore, the stepped portions 140 may provide a step between the plurality of secondary battery modules 20.

The stepped portion 140 may be the mounting point while serving as a support member for fixing the secondary battery module 20 and may be a structure for mounting the bus bar 40. Therefore, the first structure 10 according to the embodiment of the present invention may reduce the number of fastening means for fastening the parts.

The secondary battery module 20 may be mounted between the stepped portions 140. Although not shown in the drawings, the secondary battery module 20 may further include an expandable pad. The expandable pad having flexibility is provided between the battery cells 210 (referring to FIG. 5) in the secondary battery modules 20, and thus the secondary battery module 20 may have predetermined flexibility. Therefore, when the secondary battery module 20 is mounted between the two stepped portions 140, the expandable pad of the secondary battery module 20 may be compressed in a predetermined amount to be positioned between the two stepped portions 140. For this purpose, a width of the secondary battery module 20 is set to correspond to an interval between the stepped portions 140, and may be ranged equal to or slightly longer (for example, in a range of 0.1 mm to 1 mm) than the interval between the stepped portions 140 so that the expandable pad may be inserted with being compressed.

In another embodiment, the secondary battery module 20 may also be fixed to the stepped portions 140 by additional fastening members 160 such as bolts. The fastening member 160 may prevent separation of the secondary battery module 20 from the first structure 10, for example, separation of the secondary battery module 20 from the first structure 10 in a direction perpendicular to the upper surface of the plate 110. The stepped portions 140 may fix the secondary battery module 20 as well as defining a region for mounting the secondary battery module 20. However, it is not limited thereto, and the expandable pad may be positioned in the stepped portion 140 or the stepped portion 140 may be formed to have flexibility.

The placing portion 150 serves as a space in which the switch parts 60 such as the relay, the fuse, and the like may be placed. The switch part 60 attached to the secondary battery module 20 may be placed on the placing portion 150 while the secondary battery module 20 is mounted on the upper side of the first structure 10. The placing portion 150 may be configured in such a manner that even after the secondary battery pack 1000 is assembled, the parts placed on the placing portion 150 can be replaced with another part by a hole or a lid member.

Figure 6A:
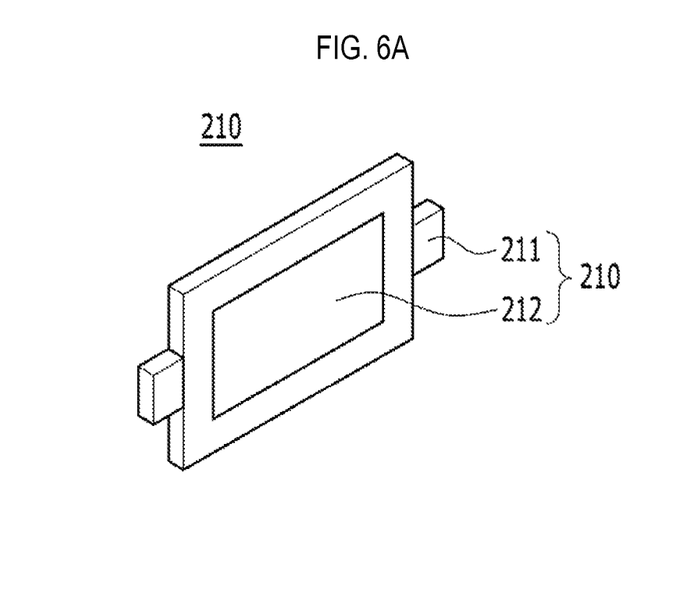
FIG. 6A is a perspective view illustrating a battery cell and FIG. 6B is a exploded view illustrating portion of secondary battery module according to an embodiment of the present invention.
Figure 6B:
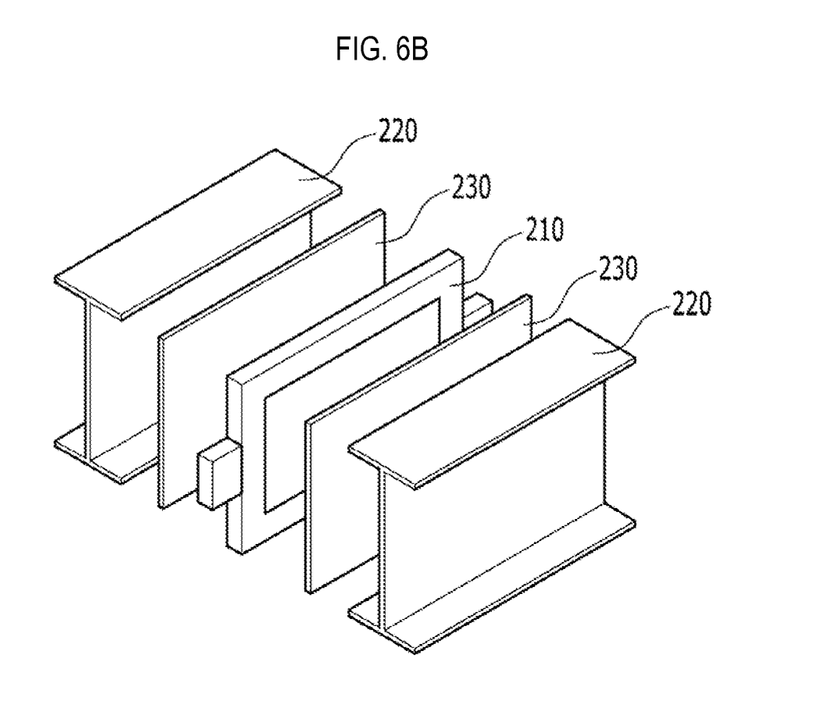

FIG. 6A is a perspective view illustrating a battery cell and FIG. 6B is an exploded view illustrating portion of secondary battery module according to an embodiment of the present invention. In particular, FIG. 6A illustrates the battery cell 210 and FIG. 6B illustrates an arrangement of the battery cell 210, the cooling fins 220, and adhesive pads 230. The secondary battery module 20 according to the embodiment of the present invention may include a plurality of battery cells 210 and a plurality of cooling fins 220.

Referring to FIG. 6A, the battery cell 210 may include electrode tabs 211. The electrode tabs 211 may be formed at one side end or both side ends of a battery cell body 212. The electrode tab 211 may be formed in a pair, including a cathode tab and an anode tab. For example, the cathode tab and the anode tab may be formed at both side ends of the battery cell body 212, respectively. Alternatively, both of the cathode tab and the anode tab may be formed at one side end of the battery cell body 212. Hereinafter, a configuration is illustrated in which the cathode tab and the anode tab are formed at both side ends of the battery cell body 212, respectively. However, the present invention is not limited thereto.

Referring to FIG. 6B, the cooling fin 220 is disposed between the plurality of battery cells 210 that are disposed apart from each other at an interval, and the adhesive pad 230 may be disposed between the battery cell 210 and the cooling fin 220 to couple or bond the battery cell 210 and the cooling fin 220 to each other. The electrode tabs 211 of the battery cells 210 may be connected to each other in series or in parallel.

FIG. 7 is an enlarged cross-sectional view illustrating a snap-fit 250 structure for coupling the cooling fins 220 to each other according to an embodiment of the present invention. The cooling fin 220 may be formed in various shapes such as in an "I" shape, in a "T" shape, in a "U" shape, and the like. The secondary battery module 20 may have a configuration in which a plurality of cooling fins 220 are arranged, and the battery cell 210 is disposed between the cooling fins 220. To couple the plurality of cooling fins 220, a snap-fit 250 structure is provided. To describe the snap-fit 250 structure, for example, the cooling fin 220 in I shape will be described below, but the shape of the cooling fin 220 is not limited thereto.

Referring to FIG. 7, the cooling fin 220 is in an I-shape in a cross section view, and the battery cells 210 are positioned on both sides of the cooling fin 220 in a length direction thereof (both sides of the I-shaped cross section). The cooling fins 220 are continuously arranged in a lateral direction, and the battery cells 210 may be disposed between the cooling fins 220 to form one secondary battery module 20.

In this case, the adjacent cooling fins 220 may be fastened to each other by one or more snap-fit 250 structures which are formed in at least one of the upper and lower portions of the I-letter cross section. The snap-fit 250 has male and female fitting pieces which are positioned to face each other and coupled with each other in a snap fitting manner. The male fitting piece of a pair of snap-fit snaps-fits 250 may include a hook-shaped locking protrusion 251, and the female fitting piece may include a locked portion 252 to which the hook-shaped locking protrusion 251 is fitted and locked. The locking protrusion 251 and the locked portion 252 are fastened with each other to couple the adjacent cooling fins 220 and prevent the cooling fins 220 from being separated. The snap-fit 250 structure may prevent the battery cell 210 from being separated from the cooling fins 220 even when repetitive vibrations are applied to the battery cell 210 (for example, vibrations of a vehicle are repetitively applied thereto when using as a battery mounted in the vehicle) while the battery cell 210 is positioned within the cooling fins 220. However, the shape of the cooling fin 220 is not limited to the I-shape. The cooling fin may be formed in any shape that may play a role of cooling and housing other battery cells 210.

Figure 8:
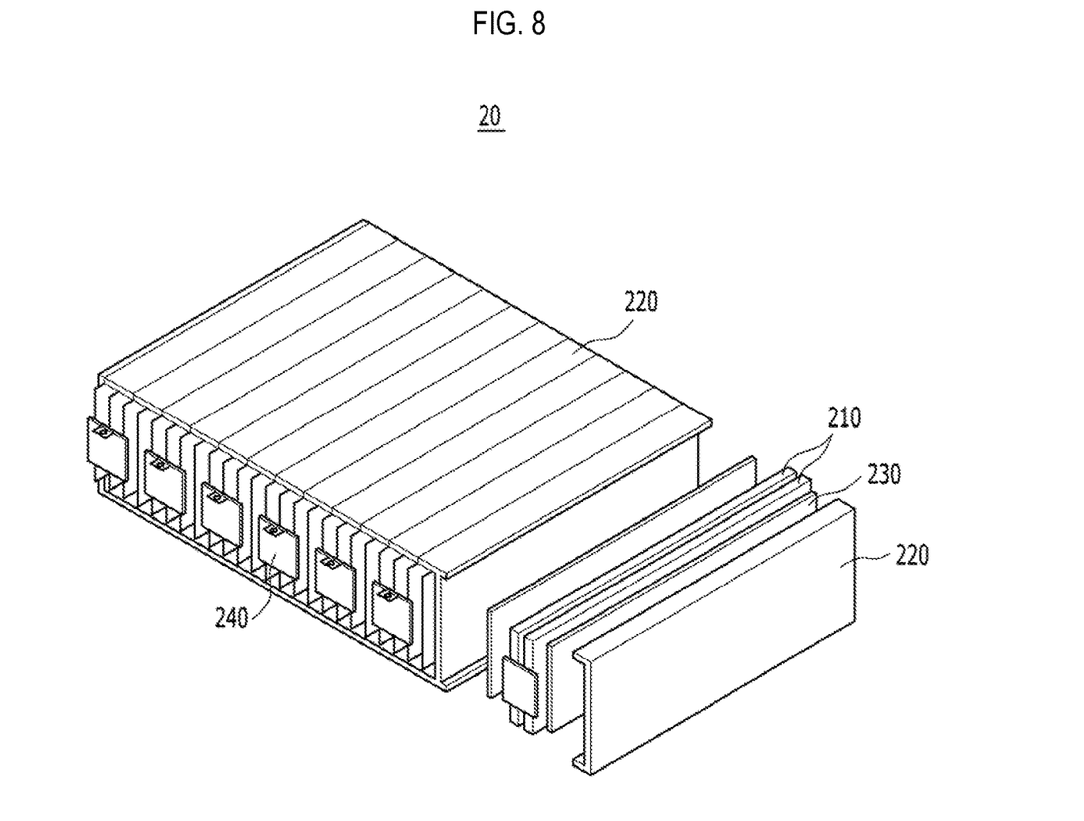
FIG. 8 is a perspective view illustrating a secondary battery module according to an embodiment of the present invention.

FIG. 8 is a perspective view illustrating the secondary battery module 20 according to an embodiment of the present invention. In the secondary battery module 20, various types of parts are integrated. The secondary battery module 20 includes the cooling fin 220 which serves as a case. Thus, a separate case is not necessary.

Referring to FIG. 8, the secondary battery module 20 includes the battery cells 210 and the cooling fins 220. The plurality of battery cells 210 may be disposed apart from each other at an interval and the cooling fin 220 may be disposed between the adjacent battery cells 210. More specifically, the cooling fin 220 is disposed between the battery cells 210 and extends to the upper and lower ends of the battery cells 210 for protecting the battery cells 210 and cooling the battery cells 210. Therefore, the cooling fin 220 may perform a dual function as a cooling structure and serve as a case for housing the battery cell 210.

To couple the battery cell 210 to the cooling fins 220, the adhesive pad 230 may be provided between the battery cell 210 to the cooling fins 220. The adhesive pad may be disposed between the battery cell 210 and the cooling fin 220 to attach the battery cell 210 and the cooling fin 220 to each other. Under this structure, a separate connection structure is not necessary, and thus the secondary battery module 20 may be configured with a reduced number of components.

The plurality of battery cells 210 and cooling fins 220 may be integrated to form the secondary battery module 20.

The secondary battery module 20 may include one or more terminal bus bars 240 that may electrically connect the plurality of battery cells 210 to each other to measure a voltage. The terminal bus bar 240 may contact a contact terminal piece 331 of a printed circuit board, which is assembled in the second structure 30 shown in FIGS. 10 and 11, without a separate connector to measure a voltage. The printed circuit board assembled in the second structure 30 may perform the BMS and sensing functions, which will be described in detail below.

Replaceable parts such as the switch part 60, including the relay and the fuse, may be mounted on one side of the secondary battery module 20. The switch part 60 mounted on one side of the secondary battery module 20 may be placed on the placing portion 150 of the first structure 10. Accordingly, when there is a need to replace parts such as the relay and the fuse, the parts may be simply replaced by replacing only the placing portion 150 of the first structure 10, thereby more efficiently performing maintenance operations such as the replacement of the parts.

In the secondary battery module 20 according to the present invention, the cooling fin 220 serves as an exterior of the secondary battery module 20. Therefore, the conventional structure such as the cover structure and the support structure of the battery module may be simplified, reducing the number of duplicated structures.

Figure 9A:
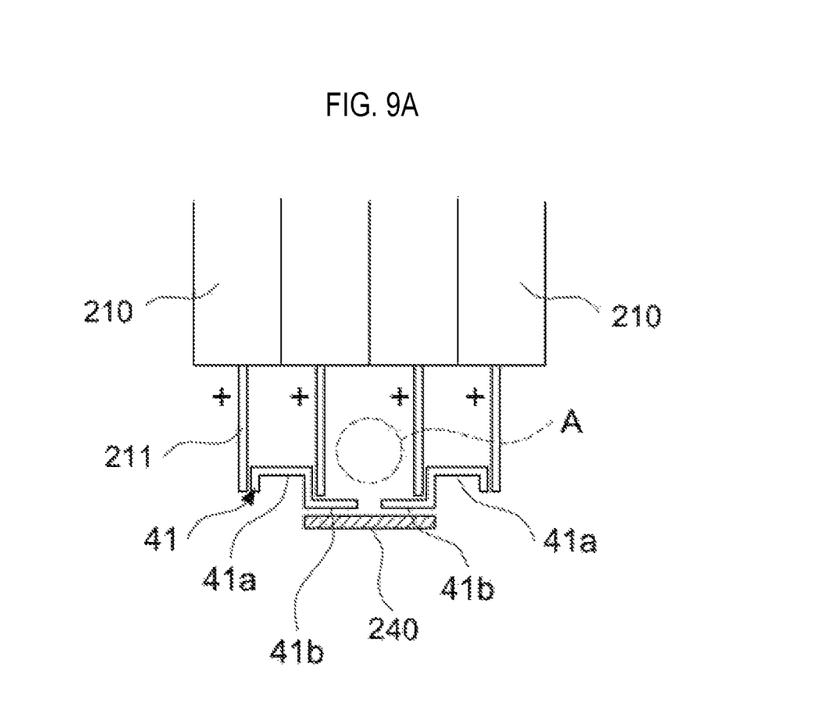
FIGS. 9A and 9B are cross-sectional views illustrating a terminal bus bar according to an embodiment of the present invention.
Figure 9B:
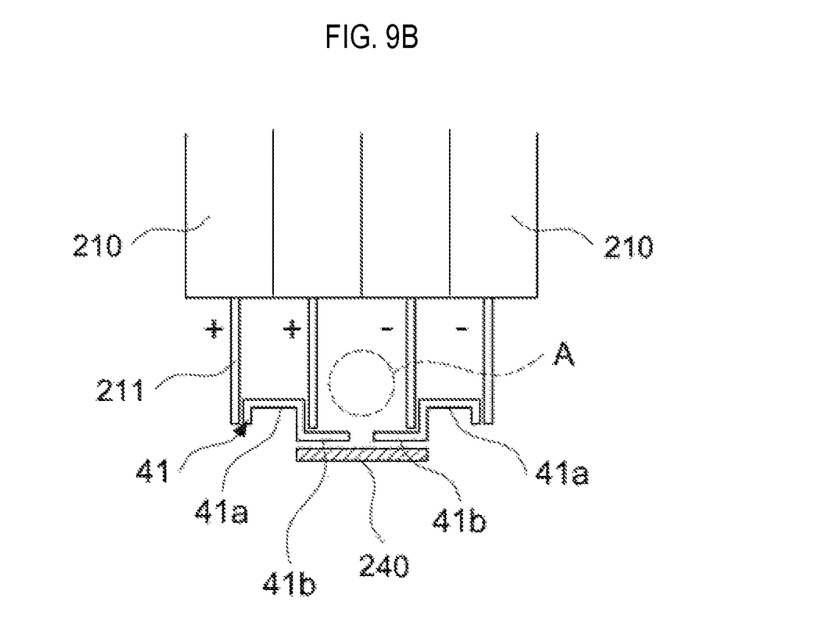

FIGS. 9A are 9B are cross-sectional views illustrating the terminal bus bar 240 for connecting the electrode tabs 12 according to an embodiment of the present invention. Referring to FIGS. 9A and 9B, the battery cell 210 may include the electrode tabs 211. The electrode tab 211 may include the cathode tab and the anode tab. The electrode tabs 211 may be connected to each other in series or in parallel. FIG. 9(a) shows that the electrode tabs 211 having same polarities (for example, (+) polarity in FIG. 9A) are connected to each other in a parallel connection, and FIG. 9B shows that a pair of electrode tabs 211 having one polarities (for example, (+) polarity in the left side of FIG. 9B) are connected to a pair of electrode tabs 211 having the other polarities (for example, (−) polarity in the right side of FIG. 9B) by combination of series and parallel. The secondary battery module 20 may include the terminal bus bar 240 configured to electrically connect the plurality of battery cells 210 to each other. Specifically, the electrode tabs 211 may be connected by the terminal bus bar 240. Terminal portions 41 may be provided for connecting the electrode tabs 211 using the terminal bus bar 240.

Furthermore, since the cooling fin 220 serves as an exterior of the battery cell 210, additional protective structures may not necessary, and thereby an interval between the battery cells 210 may be narrowed. In this case, in order to connect the battery cells 210 using the terminal bus bar 240, the terminals 41 may be disposed.

The secondary battery module 20 according to an embodiment of the present invention includes the terminal unit 41 that may connect the electrode tabs 211 of the adjacent battery cells 210 to each other, and the terminal unit 41 may include a contact terminal 41a disposed between the electrode tabs 211 of the adjacent battery cells 210210 to contact the electrode tabs 211 and a wing terminal 41b. The wing terminal 41b extends from the contact terminal 41a toward the electrode tabs 211.

In more detail, the terminal unit 41 may be disposed to contact the cathode electrode tab 211 led out from one electrode cell 210 and the anode electrode tabs 211 led out from the battery cells 210 adjacent thereto. The terminal unit 41 may include the contact terminal 41*a* and the wing terminal 41*b*. The contact terminal 41*a* is disposed between the cathode and anode electrode tabs 211, which are led out from each of one battery cells 210 and the battery cells 210 adjacent thereto to contact with each other. The wing terminal 41*b* which extends outwardly from one end of the contact terminal 41*a*.

The contact terminal 41*a* may be formed in a U shape to contact the cathode and anode electrode tabs 211, which are respectively lead out from the battery cells 210 adjacent to each other. The wing terminal 41*b* may extend outwardly from one end of the contact terminal 41*a* having the U shape. The wing terminals 41*b* of the adjacent battery cells 210 may be formed in a pair and face each other in a length direction. In other words, the wing terminal 41*b* of the terminal unit 41 may be positioned to face the wing terminal 41*b* of another terminal unit 41 adjacent to the terminal unit 41.

The terminal bus bar 240 is coupled with the wing terminal 41*b* and may be provided on the wing terminals 41*b* disposed to face each other. The adjacent battery cells 210 may be electrically connected to each other by the terminal bus bar 240. The terminal bus bar 240 is coupled with the wing terminals 41*b* disposed to face each other. That is, the terminal unit 41 disposed at the adjacent battery cells 210 among the plurality of battery cells 210 may be provided with the terminal bus bar 240 to electrically connect the adjacent battery cells 210 with each other.

The terminal bus bar 40 formed as described above may contact a contact terminal piece 331 mounted on a printed circuit board 330 to measure a voltage of the battery cells 210, which will be described in detail below with reference to FIG. 11.

Furthermore, a jig insertion space A, to which a jig for welding is inserted, may be provided inside the wing terminals 41*b* that are disposed to face each other in a direction toward the battery cell 210. Furthermore, the jig insertion space A, to which a jig for welding is inserted, may be defined by (i) two battery cells 210 adjacent to each other, (ii) the wing terminals 41*b* disposed to face each other, and (iii) the opposite electrode tabs 211. Therefore, the jig may be inserted into the jig insertion space A and welded without a separate component for welding. When the welding is completed, the jig may be removed from the jig insertion space A.

When the secondary battery module 20 is mounted under the second structure 30, the terminal bus bar 240 of the secondary battery module 20 and the contact terminal piece 331 of the second structure 30 may contact each other to measure a voltage, which will be described in detail below.

FIGS. 9A and 9B illustrates the electrode tabs 211 are connected to each other in series or in a parallel connection. However, the embodiment of the present invention is not limited thereto. The electrode tabs 211 may be connected to each other in various ways (for example, three battery cells may be connected to one another in a parallel connection, and three sets of battery cells connected in a parallel connection may be connected to one another in series (3P3S)).

Figure 10:
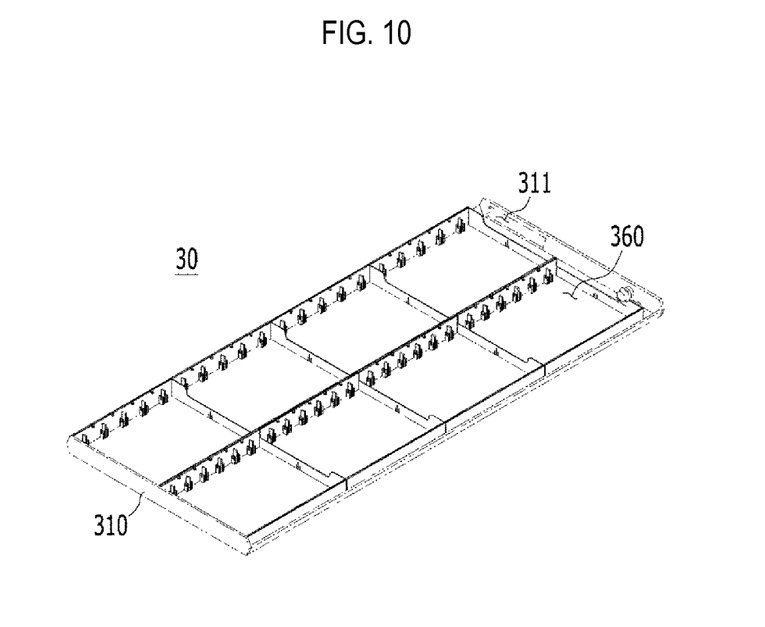
FIG. 10 is a perspective view illustrating a second structure according to an embodiment of the present invention.

FIG. 10 is a view illustrating the second structure 30 according to the embodiment of the present invention. Referring to FIG. 10, the second structure 30 may be mounted at the other side of the secondary battery module 20. In the second structure 30, the printed circuit board and the wiring harness are integrated into one unit. In detail, protective structures for the BMS, the sensing module, and the wiring harness are integrated together. The protective structures of various parts are combined and integrated in the second structure 30 as one unit. Furthermore, the second structure 30 may also serve as a cover. Specifically, the second structure 30 covers and protects for protecting electronic parts so that a case of a module, a partition, a wiring harness case, a BMS case, an upper cover of a pack, and a relay case are integrated in one large injection part.

The second structure 30 may be formed by plastic injection. The second structure 30 may include the printed circuit board 330 performing the BMS and the sensing module. The second structure 30 is coupled to the first structure 10 and may be mounted over the secondary battery module 20. The second structure 30 may support and connect a side surface portion of the secondary battery module 20. The second structure 30 may support and enclose the side surface of the secondary battery module 20 and the upper and lower sides may be a penetrated frame shape. The housing 310 of the second structure 30 may include a plurality of through holes 360 corresponding to the shape and size of the secondary battery module 20 so that the secondary battery module 20 may be inserted into and placed on the second structure 30.

Therefore, the lower portion of the secondary battery module 20 is connected to the first structure 10, the side surface of the secondary battery module 20 is connected to the second structure 30, and the upper portion of the secondary battery module 20 is connected to the cover 50 such that the secondary battery pack 1000 having the final shape may be obtained. The second structure 30 is formed in a shape corresponding to the size and the shape of the secondary battery module 20, and may cover the side surface of the secondary battery module 20. Therefore, the second structure 30 may support and protect the side surface of the secondary battery module 20.

Furthermore, the second structure 30 may include the printed circuit board 330 on which the BMS and the sensing module are mounted. That is, the second structure 30 may include a measurement control circuit including the BMS and the sensing module which may measure and control the power of the secondary battery module 20.

Furthermore, the housing 310 forming the second structure 30 may be provided with an opening 311 which is formed in one side surface of the second structure 30. The housing 310 may be provided with the plurality of through holes 360. The through holes 360 may be formed to correspond to the size and shape of the secondary battery module 20. Accordingly, the secondary battery module 20 is mounted in the through hole 360, and thus the second structure 30 may support and protect the side surface of the secondary battery module 20. The housing 310 may have the opening 311 to facilitate the replacement of the switch part 60 mounted in the secondary battery module 20. The opening 311 is formed to conveniently replace the switch parts 60 such as a relay, a fuse, and the like, which is mounted at one side of the secondary battery module 20. Typically, the parts such as the relay and the fuse need to be replaced in the battery pack. To more conveniently replace parts, the opening 311 may be formed. The opening part 311 may be formed at a place corresponding to the position of the switch part 60. Therefore, the opening 311 may be formed at a place corresponding to the position of the placing portion 150 which is formed in the first structure 10. The opening 311 may be further provided with a cover member (not shown) that may be opened and closed to safely protect the parts. Therefore, the parts disposed on the placing portion 140 may be conveniently replaced.

Furthermore, a fastening portion 350 of the housing 310 may be provided with a fastening structure so that the housing 310 is coupled with the first structure 10. The fastening structure may be fastened to the side structure 120 of the first structure 10.

The housing 310 forming the second structure 30 may have the opening 311 formed in one side surface to facilitate the replacement of the switch parts 60 which is mounted in the secondary battery module 20. The opening 311 is formed to conveniently replace the switch parts 60, including the relay, the fuse, and the like, which is mounted at one side of the secondary battery module 20. Typically, the parts such as the relay and the fuse need to be replaced in the battery pack. The opening potion 311 may be formed to facilitate the approach to the parts to be replaced. The opening part 311 may be formed at a place corresponding to the position at which the switch part 60 is positioned. Therefore, the opening 311 may be formed at a place corresponding to the position of the placing portion 150 which is formed in the first structure 10. The opening 311 may be further provided with a cover member (not shown) that may be opened and closed to safely protect parts. Therefore, the parts disposed on the placing portion 140 may be conveniently replaced.

Furthermore, the housing 310 may be formed with the fastening structure to be coupled with the first structure 10. The fastening structure may be formed to be fastened with the side structure 120 of the first structure 10.

Figure 11:
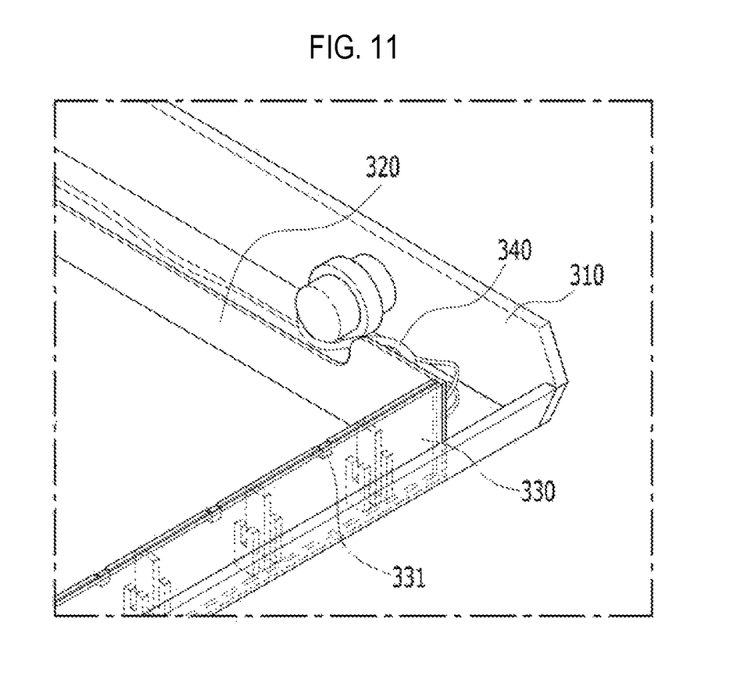
FIG. 11 is an enlarged perspective view illustrating a second structure according to an embodiment of the present invention.

FIG. 11 is an enlarged perspective view illustrating the second structure 30 according to an embodiment of the present invention. Referring to FIG. 11, the second structure 30 is provided with the printed circuit board 330 forming various types of control circuits and may be provided with a barrier 320 in which the printed circuit board 330 mounted. The printed circuit board 330 may be disposed outside the barrier 320 and, the secondary battery module 20 may be mounted inside the barrier 320.

The printed circuit board 330 may serve as the BMS and the sensing module. Specifically, the printed circuit board 330 has the BMS and the sensing portion to read a signal and control the secondary electronic pack 1000. The printed circuit board 330 has the contact terminal piece 331 to measure a voltage without the separate welding and the connector connection.

The barrier 320 may be formed to mount the printed circuit boards 330 forming various types of control circuits. The printed circuit board 330 may be mounted in the barrier 320 while securing the minimum power. The printed circuit board 330, including the BMS and sensing module functions, may be disposed between the housing 310 and the barrier 320. The secondary battery module 20 may be mounted inside the barrier 320. As a result, it is possible to mount the secondary battery module 20 while protecting the printed circuit board 330 without a separate case. Furthermore, the barrier wall 320 may be provided with a groove so that the contact terminal piece 331 mounted on the printed circuit board 330 protrudes toward the inside of the barrier 320.

The printed circuit board 330 may include the contact terminal piece 331 that contacts the terminal bus bar 240 of the secondary battery module 20 to measure a voltage. More specifically, the printed circuit board 330 includes the contact terminal piece 331. The contact terminal piece 331 is made of an elastic member such as a spring, and thus the contact terminal piece 331 may be expanded and contracted. The terminal bus bar 40 and the contact terminal piece 330 may contact each other so that the secondary battery module 20 and the second structure 30 are separated from each other and may be coupled to each other. When the secondary battery module 20 is mounted in the second structure 30, in order to prevent the contact terminal piece 331 protruding toward the inside of the second structure 30 from being damaged, the contact terminal piece 331 may be made of the elastic member having an elastic force. Accordingly, when the secondary battery module 20 and the second structure 30 are coupled to each other, the terminal bus bar 240 and the contact terminal piece 330 may more stably contact each other. Furthermore, a wiring harness 340 led out from the printed circuit board 330 may be disposed between the housing 310 and the barrier 320. As a result, it is possible to protect the printed circuit board 330, the wiring harness 340, and the like without a separate protective structure. Furthermore, since the contact terminal piece 331 and the terminal bus bar 240 directly contact each other to measure a voltage, mounting the separate connector is not required. As a result, the secondary battery module 20 is mounted in the first structure 10, the second structure 30 including the printed circuit board 330 is mounted on the secondary battery module 20, and the cover 50 covers the second structure 30 to form the secondary battery pack 1000. However, an order in which the first structure 10, the secondary battery module 20, the second structure 30, and the cover 50 are mounted is not particularly limited.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the above-described embodiments, but be defined by the appended claims as well as equivalents thereof.

What is claimed is:

1. A secondary battery pack, comprising:
 a secondary battery module including battery cells and cooling fins;
 a first structure formed under the secondary battery module;
 a second structure which is formed in a shape mounted on side faces of the secondary battery module and includes a printed circuit board; and
 a cover mounted over the second structure,
 wherein the first structure further includes a plate and a side structure,
 wherein the side structure is provided over first and second sides of the plate,
 wherein the plate includes a cooling channel, and
 wherein each structure includes a coupling bracket.

2. The secondary battery pack of claim 1,
 wherein the side structure includes an inflow channel and an outflow channel,
 wherein a coolant is introduced into the inflow channel and discharged to the outflow channel, and
 wherein the inflow channel and the outflow channel are respectively located over the first and the second sides of the plate.

3. The secondary battery pack of claim 1, further comprising:
 stepped portions formed over the plate and spaced apart from each other, and
 wherein the secondary battery module is placed between the stepped portions.

4. The secondary battery pack of claim 1, further comprising:
 a placing portion provided over a third side of the plate and including a switch member, and wherein the switch member includes a relay, a fuse, or both.

5. The secondary battery pack of claim 1,
wherein the cooling fins are arranged side by side at a first interval, and
wherein each of the battery cells is disposed between the cooling fins.

6. The secondary battery pack of claim 5,
wherein the secondary battery module, the first structure, and the second structure are stacked in a first direction,
wherein the cooling fins are arranged side by side in a second direction,
wherein the second direction is perpendicular to the first direction,
wherein each of the cooling fins includes an upper extension and a lower extension,
wherein the upper extension extends from a top of each of the cooling fins to a neighboring upper extension in the second direction,
wherein the lower extension extends from a bottom of each of the cooling fins to a neighboring lower extension in the second direction,
wherein the upper extension is coupled to the neighboring upper extension to form an upper exterior of the secondary battery module, and
wherein the lower extension is coupled to the neighboring lower extension to form a lower exterior of the secondary battery module.

7. The secondary battery pack of claim 1,
wherein the secondary battery module further includes a terminal bus bar and electrode tabs,
wherein each of the electrode tabs extends from each of the battery cells,
wherein the terminal bus bar electrically connects the electrode tabs to each other, and
wherein the terminal bus bar contacts the printed circuit board.

8. The secondary battery pack of claim 1,
wherein the secondary battery module further includes a terminal unit and first and second electrode tabs,
wherein the battery cells include first and second battery cells,
wherein the first and the second electrode tabs extend from the first and the second battery cells, respectively,
wherein the terminal unit includes a first contact terminal and a first wing terminal,
wherein the first contact terminal is disposed between the first and the second electrode tabs and connects the first and the second electrode tabs to each other, and
wherein the first wing terminal extends from the first contact terminal.

9. The secondary battery pack of claim 8,
wherein the secondary battery module further includes third and fourth electrode tabs,
wherein the battery cells include third and fourth battery cells,
wherein the third battery cell is located next to the second battery cell,
wherein the third and the fourth electrode tabs extend from the third and the fourth battery cells, respectively,
wherein the terminal unit further includes a second contact terminal and a second wing terminal,
wherein the second contact terminal is disposed between the third and the fourth electrode tabs and connects the third and the fourth electrode tabs to each other,
wherein the second wing terminal extends from the second contact terminal, and
wherein the second wing terminal faces the first wing terminal.

10. The secondary battery pack of claim 9, further including:
a jig insertion space,
wherein the jig insertion space is defined by (i) the first and the second wing terminals, (ii) the second and the third battery cells, and (iii) the second and the third electrode tabs.

11. The secondary battery pack of claim 9, further comprising:
a terminal bus bar,
wherein the terminal bus bar is coupled to the first and the second wing terminals.

12. The secondary battery pack of claim 11,
wherein the terminal bus bar is coupled to the printed circuit board.

13. The secondary battery pack of claim 1, wherein the second structure includes:
a housing;
a barrier formed in the housing;
a printed circuit board and a wiring harness which are disposed between the housing and the barrier; and
holes formed in the housing.

14. The secondary battery pack of claim 1,
wherein the printed circuit board includes a contact terminal piece,
wherein the contact terminal piece is configured to measure a voltage, and
wherein the contact terminal piece contacts a terminal bus bar of the secondary battery module to measure a voltage.

15. The secondary battery pack of claim 4,
wherein the second structure includes an opening, and
wherein the opening is formed directly over the placing portion, so that the switch member is replaced with a new switch member through the opening.

16. A secondary battery pack, comprising:
a secondary battery module including battery cells and cooling fins;
a first structure provided under the secondary battery module to protect the secondary battery module and cool the secondary battery module;
a second structure which is mounted on the other side of the secondary battery module to protect the secondary battery module, and has a measurement control circuit mounted therein to measure and control a voltage of the secondary battery module; and
a cover mounted over the second structure,
wherein the first structure further includes a plate and a side structure,
wherein the side structure is provided over first and second sides of the plate, wherein the plate includes a cooling channel, and
wherein the side structures include a coupling bracket.

17. The secondary battery pack of claim 16,
wherein the second structure includes a contact terminal piece, and
wherein the contact terminal piece elastically contacts the measurement control circuit and the secondary battery module and electrically connects the measurement control circuit and the secondary battery module to each other.

18. A secondary battery pack, comprising:
a first structure;
a second structure mounted on the first structure;

a secondary battery module disposed between the first and second structures; and a cover mounted over the second structure to cover the secondary battery module, wherein the first structure includes a plate having a cooling structure, a first side structure provided over a first side of the plate, a second side structure provided over a second side of the plate, said first and second side structures each including a coupling bracket.

19. The secondary battery pack of claim 18, wherein the first structure further comprises first and second stepped portions spaced apart at a regular interval over the plate for accommodating the secondary battery module therebetween.

* * * * *

UNITED STATES PATENT AND TRADEMARK OFFICE
CERTIFICATE OF CORRECTION

PATENT NO. : 10,340,559 B2
APPLICATION NO. : 15/625827
DATED : July 2, 2019
INVENTOR(S) : Kwon et al.

It is certified that error appears in the above-identified patent and that said Letters Patent is hereby corrected as shown below:

In the Claims

Please correct Claim 1 at Lines 35-49 in Column 14 and Claim 16 at Lines 39-56 in Column 16 as shown below:

1. A secondary battery pack, comprising:
a secondary battery module including battery cells and cooling fins;
a first structure formed under the secondary battery module;
a second structure which is formed in a shape mounted on side faces of the secondary battery module and includes a printed circuit board; and
a cover mounted over the second structure,
wherein the first structure further includes a plate and a side structure,
wherein the side structure is provided over first and second sides of the plate,
wherein the plate includes a cooling channel, and
wherein each side structure includes a coupling bracket.

16. A secondary battery pack, comprising:
a secondary battery module including battery cells and cooling fins;
a first structure provided under the secondary battery module to protect the secondary battery module and cool the secondary battery module;
a second structure which is mounted on a side of the secondary battery module to protect the secondary battery module, and has a measurement control circuit mounted therein to measure and control a voltage of the secondary battery module; and
a cover mounted over the second structure,
wherein the first structure further includes a plate and a side structure,
wherein the side structure is provided over first and second sides of the plate, wherein the plate includes a cooling channel, and
wherein the side structure includes a coupling bracket.

Signed and Sealed this
Seventh Day of June, 2022

Katherine Kelly Vidal
*Director of the United States Patent and Trademark Office*